Nov. 29, 1949    F. S. FLICK    2,489,769
CYLINDER HEAD STRUCTURE
Filed May 31, 1946

Inventor:
Francis S. Flick
By Chritton, Schroeder, Meriam & Hofgren
Attorneys

Patented Nov. 29, 1949

2,489,769

UNITED STATES PATENT OFFICE 2,489,769

CYLINDER HEAD STRUCTURE

Francis S. Flick, Chicago, Ill., assignor of one-third to William Reedy

Application May 31, 1946, Serial No. 673,653

6 Claims. (Cl. 308—36.1)

1

This invention relates to cylinder heads, and more particularly to an improved arrangement for locking a piston rod bushing and packing washer in the cylinder head to obtain good seal and alignment for the piston rod.

The primary object of the invention is to provide a construction in an air cylinder head wherein the bushing is secured without threading and will be gripped in position tightly and will also hold the packing washer.

In building air cylinders with a high degree of accuracy, it is important that the bushing be held securely in position and properly aligned with the cylinder. If the bushing is held in position by having its flange gripped by a retainer plate, very accurate fitting must be provided between the flange of the bushing and the bore in the cylinder head. If the flange is slightly smaller than the depth of the bore in the cylinder head it will be loose, and if the flange is slightly bigger, the retainer plate will be warped when the tie rods are drawn up properly.

In the present invention the flange is made a little thinner than the depth of the bore, and a gasket is inserted which preferably encircles the packing washer. This enables all of the parts to be properly aligned and tightly gripped in proper position.

The invention is illustrated in a preferred embodiment in the accompanying drawings, in which—

Figure 1:
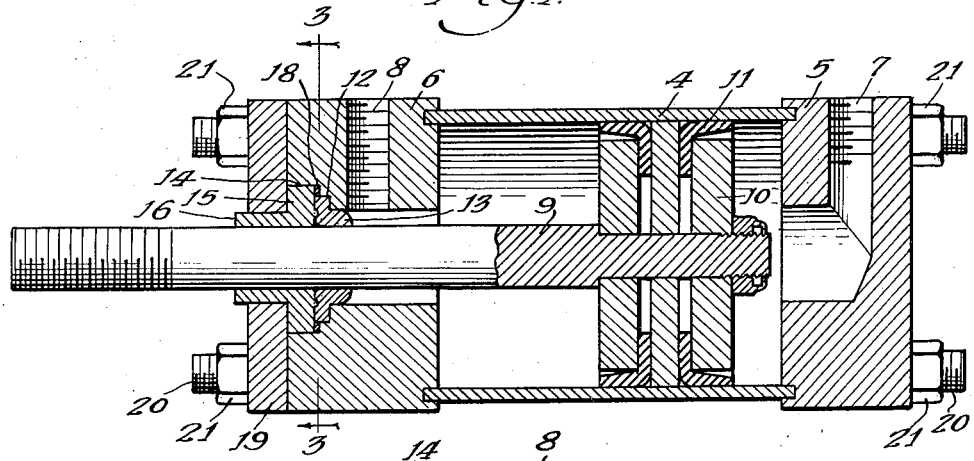
Figure 2:
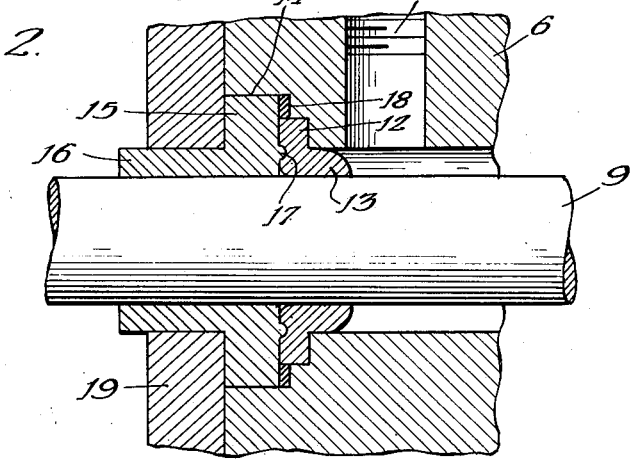
Figure 3:
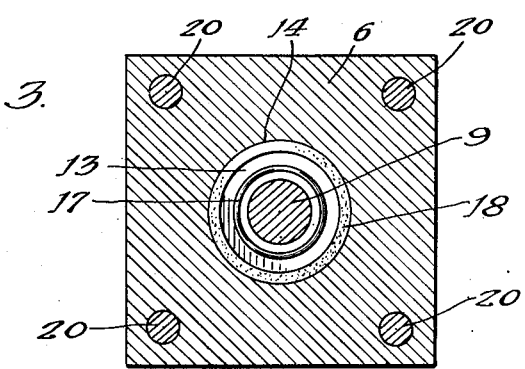

Figure 1 is a longitudinal sectional view of an air cylinder embodying the invention; Fig. 2 is an enlarged fragmentary sectional view of the piston rod bushing and associated parts; and Fig. 3, a sectional view, taken as indicated at line 3—3 of Fig. 1.

In the embodiment illustrated, a piece of cylindrical tubing 4 fits into circular grooves provided in square cylinder heads 5 and 6. The cylinder head 5 is provided with a port 7 and the cylinder head 6 has a port 8. A piston rod 9 extends through a bore in the cylinder head 6, and is provided with a piston head 10 and packing 11. It will be noted that the head 6 has an intermediate size bore 12, to receive the flange of the packing washer 13, and a larger size bore 14, to receive the flange 15 of a piston rod bushing 16. The inner face of the piston rod bushing 16 is provided with a bead 17 which grips the flange of the packing washer against the head 6. It will be noted that the bore 14 is slightly greater in depth than the thickness of the flange 15, and in order to insure a tight fit, a gasket 18 is provided which preferably encircles the packing

2 washer 13. In the drawings the thickness of this gasket is enlarged for the purpose of illustration, but actually it is a flat thin gasket. It is preferred to place the gasket as shown, but it can be on the other side of the flange 14 so as to be engaged by the retainer plate 19.

The retainer plate has a bore which is large enough to receive the outer end of the bushing 16, and is machined to fit accurately against the square end of the cylinder head. Four tie rods 20, provided with nuts 21, hold the parts of the assembly together.

By the arrangement shown, the bushing is gripped securely in position, and while it bears against the soft packing washer it does not rely on the pressure of the washer to hold it against longitudinal movement with respect to the piston rod and cylinder head. The gasket 18 enables the parts to be made with a little tolerance and without danger of warping the retaining plate 19 when the assembly is drawn together. It is important to avoid any warping or distortion of the retaining plate, as this plate is used as a base for various aligned mounting brackets.

The foregoing detailed description is given for clearness of understanding only, and no unnecessary limitations should be understood therefrom, for some modifications will be obvious to those skilled in the art.

I claim:

1. In combination: a cylinder head having a small bore to admit a piston rod, an intermediate bore to receive the flange of a packing washer, and a larger bore to receive the flange of a piston rod bushing; a piston rod bushing bored to fit the piston rod and having a flange of slightly less thickness than the depth of said larger bore and seated therein; a gasket in said larger bore and bearing against a side face of said bushing flange; a retainer plate having a bore to receive the outer part of said piston rod bushing, said plate serving to clamp the bushing flange tightly against said gasket and to secure the bushing in the cylinder head, and a packing washer having a flange tightly seated in said intermediate bore.

2. Apparatus as specified in claim 1, in which the gasket surrounds the flange of the packing washer.

3. Apparatus as specified in claim 1, in which the gasket encircles the packing washer and the inner end of the bushing flange has a circular head gripping the packing washer.

4. Sealing means for a piston rod reciprocably mounted in a cylinder head, comprising a cylinder head having a small bore, a piston rod extending through said small bore, said cylinder head also having an intermediate bore and a larger bore, a packing washer in said small bore in sealing contact with the piston rod and having a flange seated in the intermediate bore and extending partway into the inner space of the larger bore, a gasket in said larger bore bearing against one side wall thereof outside of the washer flange and in contact with the washer flange, a bushing having a flange seated in said larger bore and bearing against said gasket and washer flange, and means for pressing said bushing flange against said gasket and washer flange.

5. Sealing means for a reciprocating rod, comprising a head member having a small bore through which said rod moves, said head member having an intermediate bore of greater diameter than said small bore and connected therewith and a large bore of greater diameter than the intermediate bore and connected therewith, said large bore opening out of one side face of the head member, a rod bushing having a flange seated in said large bore, a gasket between the inner face of the bushing flange and the inner side wall of the large bore, a packing washer having a flange seated in said intermediate bore, said gasket encircling the outer edge of the packing washer flange, said packing washer also having a portion extending longitudinally in the small bore and in contact with the rod, a retainer plate seated on said bushing and bearing against the outer side face of the bushing flange, and means for forcing the retainer plate against the bushing flange to bring the inner face of the retainer plate, the outer face of the head member, and the outer face of the bushing flange into a common plane and force the packing washer into sealing contact with the rod.

6. Sealing means as claimed in claim 5, in which the inner face of the bushing flange is formed with an inwardly extending annular projection to be forced into the packing washer to increase its sealing action with relation to the rod.

FRANCIS S. FLICK.

REFERENCES CITED

The following references are of record in the file of this patent:

UNITED STATES PATENTS

| Number | Name | Date |
|---|---|---|
| 664,453 | Ambrose | Dec. 25, 1900 |
| 2,230,286 | Cotner | Feb. 4, 1941 |

FOREIGN PATENTS

| Number | Country | Date |
|---|---|---|
| 606,218 | France | 1926 |